United States Patent [19]

Duvall et al.

[11] Patent Number: 4,761,737

[45] Date of Patent: Aug. 2, 1988

[54] METHOD TO AUTOMATICALLY INCREASE THE SEGMENT SIZE OF UNIX FILES IN A PAGE SEGMENTED VIRTUAL MEMORY DATA PROCESSING SYSTEM

[75] Inventors: Keith E. Duvall, Georgetown; Anthony D. Hooten, Round Rock, both of Tex.; John C. O'Quin, III, Chappaqua, N.Y.; Todd A. Smith, Austin, Tex.

[73] Assignee: International Business Machines Corporation, Armonk, N.Y.

[21] Appl. No.: 819,456

[22] Filed: Jan. 16, 1986

[51] Int. Cl.[4] ............................................. G06F 12/08
[52] U.S. Cl. ..................................... 364/300; 364/200
[58] Field of Search ... 364/200 MS File, 900 MS File, 364/300

[56] References Cited

U.S. PATENT DOCUMENTS

| | | | |
|---|---|---|---|
| 4,084,226 | 4/1978 | Anderson et al. | 364/200 |
| 4,197,588 | 4/1980 | Cason et al. | 364/900 |
| 4,445,170 | 4/1984 | Hughes et al. | 364/200 |
| 4,481,573 | 11/1984 | Fukunaga et al. | 364/200 |
| 4,536,837 | 8/1985 | Olson et al. | 364/200 |
| 4,581,702 | 4/1986 | Saroka et al. | 364/200 |
| 4,638,426 | 1/1987 | Chang et al. | 364/200 |
| 4,718,008 | 1/1988 | Chang et al. | 364/300 |
| 4,730,249 | 3/1988 | O'Quinn et al. | 364/200 |

*Primary Examiner*—Archie E. Williams, Jr.
*Assistant Examiner*—Robert D. Anderson
*Attorney, Agent, or Firm*—Richard E. Cummins

[57] ABSTRACT

A memory management system method increases the size of a segment in blocks of 64K virtual pages in response to the system detecting that the requested page has been protected. The conventional UNIX type System Calls create and open files in virtual memory. All pages are protected "read only" until a SHMAT type System Call is made to operate on a page at a specific address. At that point in the process, a protection exception is recognized by the system and the UNIX kernel takes control to remove the protection and update the appropriate data structures to reflect the new status of the page and the addresses in real memory where the page may be found. Segments containing mapped files are also extended by the method.

11 Claims, 10 Drawing Sheets

FLOW CHART OF MAP PAGE RANGE SERVICE

EXTENDING A MAPPED FILE (DETAIL)

METHOD TO AUTOMATICALLY INCREASE THE SEGMENT SIZE OF UNIX FILES IN A PAGE SEGMENTED VIRTUAL MEMORY DATA PROCESSING SYSTEM

TECHNICAL FIELD

This invention relates in general to a methods for use in a virtual memory data processing, and in particular, to an improved method for automatically increasing the number of virtual page addresses that have been assigned to a segment of a page segmented virtual memory type data processing system after the segment has been initially created.

CROSS-REFERENCED APPLICATION

U.S. Application Ser. No. 06/819,458, now U.S. Pat. No. 4,742,447, filed concurrently herewith in the name of Duvall et al, entitled "Method to Control I/O AccessES in a Multi-Tasking Virtual Memory Virtual Machine Type Data Processing System" is directed to a method for use in a multi-user paged segmented virtual memory data processing system in which a mapped file data structure is selectively created to permit all I/O operations to the secondary storage devices to be executed by simple load and store instructions under the control of the page fault handler.

DESCRIPTION OF THE PRIOR ART

The prior art discloses a number of data processing systems which are capable of running a UNIX* type operating system. U.S. Pat. Nos. 4,536,837; 4,470,115; 4,104,718 and 4,047,244 are representative of the patents which describe UNIX based data processing systems.

*Unix is a trademark of A.T.&T.

In addition, there are a number of publications and manuals which describe, at various levels, the architecture and operation of the UNIX operating system and the various versions, releases, and look-alike derivatives of the basic UNIX system. The following are a representative sample of such publications.

1. "A Tour Through the UNIX File System," James Joyce, October 1983, pp 170-182, Byte Publications, Inc.
2. "UNIX as an Application Environment," Mark Krieger, et al, October 1983, pp 209-214, Byte Publications, Inc.
3. "The UNIX System Calls," Brian W. Kernigham, et al, 1984, pp 203-231, The Unix Programming Environment.
4. "UNIX Time-Sharing: A Retrospective," D. M. Ritchie, January 1977, pp 1947-1969, The Bell System Technical Journal, July-August 1978.
5. 37 UNIX Variant Opens a Path to Managing Multiprocessor Systems," Paul Jackson, July 1983, pp 118-124, Electronics.
6. "UNIX-Berkeley 4,2 Gives UNIX Operating System Network Support," Bill Joy, July 1983, pp 114-118, Electronics.
7. "The UNIX Tutorial, Part 1," David Fiedler, August 1983, pp 186-219, Byte Publications, Inc.
8. "The UNIX Tutorial, Part 2," David Fiedler, September 1983, pp 257-278, Byte Publications, Inc.

UNIX FILES

The fundamental structure that the UNIX operating system uses to store information is the file. A file is a sequence of bytes, typically 8 bits long, and is equivalent to a character. UNIX keeps track of files internally by assigning each one a unique identifying number. These numbers, called inode numbers, are used only within the UNIX operating system kernel itself. While UNIX uses inode number to refer to files, it allows users to identify each file by a user-assigned name. A file name can be any sequence containing from one to fourteen characters.

There are three types of files in the UNIX file system: (1) ordinary files, which may be executable programs, text, or other types of data used an input or produced as output from some operation, (2) directory files, which contain lists of files, and (3) special files, which provide a standard method of accessing I/O devices.

UNIX DIRECTORIES

UNIX provides users a way of organizing files. Files may be grouped into directories. Internally, a directory is a file which contains the names of ordinary files and other directories, and their corresponding inode numbers. Given the name of a file, UNIX looks in the file's directory and obtains the corresponding inode number for the file. With this inode number, UNIX can examine other internal tables to determine where the file is stored and to make it accessible to the user. UNIX directories themselves have names, each of which may also contain fourteen characters.

UNIX HIERARCHICAL FILE SYSTEM

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with the single directory. All the files that can be reached by tracing a path down through the directory hierarchy from the root directory constitute the file system.

UNIX FILE SYSTEM ORGANIZATION

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the inode structure. Each inode is addressed by an index contained in an i-list. The i-list is generated based on the size of the file system, with larger file systems generally implying more files, and thus larger i-lists. Each inode contains thirteen 4-byte disk address elements. The direct inode can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct inode is required.

UNIX FILE SYSTEM ACCESS VIA READ/WRITE SYSTEM CALLS

All input and output is done by reading the writing files, because all peripheral devices, even terminals, are files in the file system. In a most general case, before reading and writing a file, it is necessary to inform the system of your intent to do so, by way of opening the file. In order to write to a file, it may also be necessary to create it. When a file is opened or created (by way of the 'open' or 'create' system calls), the system checks for the right to do so, and if all is well, returns a non-negative integer called a file descriptor. Whenever I/O is to be done on this file, the file descriptor is used instead of the name to identify the file. This open file descriptor has associated with it a file table entry kept in the "process" space of the user who has opened the file. In UNIX terminology, the term "process" is used interchangeably with a program that is being executed. The file table entry contains information about an open file, including an inode pointer for the file, and the file pointer for the file, which defines the current position to be read or written in the file. All information about an open file is maintained by the system.

In conventional UNIX, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remained to be read. A return value of zero implies end of file, a return value or $-1$ indicates an error of some sort. For writing, the value returned is the number of bytes actually written. An error has occurred if this isn't equal to the number supposed to be written.

The 'read' and 'write' system calls' parameters may be manipulated by the application program which is accessing the file. The application must therefore be sensitive to and take advantage of the multi-level store characteristics inherent in a standard system memory hierarchy. It is advantageous, from the application perspective, if the system memory components can be viewed as a single level hierarchy. If this were properly done, the application could dispense with most of the I/O overhead.

The prior art also discloses a number of multi-tasking virtual memory data processing systems in which the system architecture is based on establishing a different "virtual machine" or terminal for each of the applications that are run concurrently on the system. In such systems, the operating system executes in a virtual machine which is established by a Virtual Resource Manager. The Virtual Resource Manager (VRM) is a group of programs or processes that extend the system's processor or microprocessor and the system's memory management unit, to provide a high level port for the operating system in a virtual machine environment.

A software interface between the program and the operating system and the programs of the Virtual Resource Manager is established, and referred to as the Virtual Machine Interface (VMI). A virtual machine, therefore, has a very high-level physical machine-like interface.

In most prior art systems which operate in a multi-tasking virtual machine environment, the Virtual Resource Manager provides the virtual machine with virtual memory that is transferred to the virtual machine. Various arrangements for managing the address space of the virtual memory are used by these prior art virtual memory systems. In one well-known technique, referred to as "Paged Segmentation," the entire address range of the virtual memory is divided into equal-sized segments. The virtual address, therefore, comprises two portions; a segment ID and an offset. For example, the virtual address space comprises $2*(4.0)$, 2 to the exponent 40 address locations, a virtual address consisting of 40 bits is required. If a segment identifier of 12 bits and an offset of 28 bits is used for the format of the virtual address, then $2*(12)$ or 4,096 separate segments are provided, with each segment having $2*(28)$ or $256 \times 10*(6)$ separate address locations. If it is assumed that each address location can store one page of data, and one page of data holds 2048 (2K) bytes, then the capacity of the virtual memory is 1 terabyte (2 [43]).

These prior art systems also employ different arrangements for generating the virtual address, depending on the architecture of the system processor. One technique employed by processors which have an effective real memory address of 32 bits is to employ a predetermined number "n" of the high order address bits to select one out of two to the 2 (n) segment ID registers, each of which is capable of storing a segment ID having the required length. In the previous example of the 40 bit virtual address, the segment register would have 12 stages for storing a 12 bit segment ID, which is concatenated with the remaining 28 bits of the processor's effective real address, which provides the offset portion of the 40 bit virtual address.

A virtual machine that is created by the VRM generally will define a number of memory segments with which it will be working at any one time. To access data in one of the segment, the virtual machine loads a segment identifier into one of the 16 segment registers, using the previous example of the addressing technique. Segments that are selected by the virtual machine are usually private, unless the virtual machine grants access to other virtual machines. Access to segments can be controlled by the operating system of the virtual machine.

A virtual memory system generally employs a page faulting mechanism which functions to control the paging of data between the system memory and the disk files. These storage devices are often referred to as primary and secondary storage, or front and back store devices. The paging function is, to some extent, similar to I/O operations run by the application program. So much so, that in some simple paging systems, a conflict arises between file I/O operations which are under control of the application program and the operating system, and paging operations. For example, a file device driver may read disc data into a memory buffer, then the paging system, acting independently, may write the newly buffered data back out to the disk. When there is no coordination of effort between the file I/O subsystem and the paging I/O subsystem, potential duplication exists with program loading, in that the loader will read a program from the library section of the back store to the front store, while the paging I/O function will return the program to a different disk address during a page out operation.

Is is, therefore, important that the data processing system reflect the degree of coordination between the two similar functions, and various arrangements have been disclosed in the prior art for achieving this coordination. However, the required coordination does have an impact on system performance, and prior art coordination techniques become quite unmanageable when an attempt is made to implement them in a multi-tasking, multi-user virtual memory UNIX-type environment employing a very large virtual memory.

In accordance with the method of the cross-referenced application, a virtual machine environment is established in which all file I/O operations can be assigned to the page faulting mechanism of the memory manager unit which is part of the Virtual Resource Manager that establishes the virtual machine. The UNIX read and write system calls to UNIX-structured files is maintained, as are the conventional data structures employed by the page faulting mechanism. Structures such as the External Page Table, for recording correspondence between addresses in virtual memory and real addresses and the real address location of data on the disk file are maintained, as is the Inverted Page Table which correlates virtual addresses of pages in system memory, with system memory real addresses.

In the system described in the cross referenced application, the Virtual Memory Manager allows the data contained within a segment to be associated with files in the virtual machine's file system, thus allowing that data to exist after the execution of a program. This association of file data to virtual pages is achieved through, what is referred to as, mapped files or mapping of files.

The Map Page Range service that is established is provided to allow a virtual machine the ability to create a one-level store environment for a subset, such as the mapping of an individual file. It should be noted that generally most operating systems, such as the UNIX operating system, provide the ability for an application program to access disk files through the conventional I/O system call. On the other hand, application programs generally do not have the ability independent of an operating system, to access secondary storage files, such as disk drives. Application programs, however, are designed to operate intimately with the microprocessor to address system memory by so-called load and store instructions.

The Map Page Range service allows a virtual machine to create a "one-level store" environment. This service is necessary, because neither the operating system executing in the virtual machine, nor the Virtual Resource Manager have the capability of themselves to map a file. The virtual machine does not have access to the Virtual Memory Manager's table and the Virtual Resource Manager is designed to be independent of the virtual machine's file system structure. The Map Page Range service provides the virtual machine the ability to tell the VMM the relationship between a logical entity, such as a file, and its location on the disk.

The method selectively maps the disk blocks of a file to a different memory segment. The mapping process dynamically maps a range of blocks (one block contains one page equal to 2K), that have been allocated on the disk storage device for a given file. The map is stored in real memory, in space assigned to the virtual machine.

Once this mapping is achieved, a program running in a virtual machine can execute machine level data access operations without regard to the physical location of the data at the time of access. If the data is not in active memory at the time of reference, then a page fault is induced. The underlying paging system resolves the page fault by referencing the address location of the fault, and if the data is actually allocated on a secondary storage device, then this address location will correspond to a physical location on the secondary device which is defined by the page mapping for that segment address. Each virtual address in the segment range has, at most, one physical data location on the secondary device. Conversely, each physical data location on the secondary device may be referenced by 2,048 separate segment addresses. The logical and physical extent of the relationship between a page and a block of data is what defines the above relationship. The address specification then may be seen as discrete to the byte level, but always rounded down to the first 2K boundary for the actual secondary device location.

The enhancement to the "kernel" of the operating system implements the mapped page range support in the form of "mapped executables." When a program is loaded, the kernel maps the program's disk blocks to distinct virtual memory text and data segments. In UNIX terminology, "text" is the part of the program that is fixed, whereas variable data such as tables and constants are referred to as "data." The kernel performs very little physical I/O to load the program. Only the program file head is read by the kernel. All remaining disk I/O is demand paged as the program is executed. This results in a significant performance increase for large programs which, without Map Page Range support, would have to be read entirely into memory and possibly paged out by the paging supervisor.

This map file support consists of a system call interface to the Map Page Range facilities. The prior art UNIX system call "SHMAT" has been modified to include a flag bit which may be specified in the SHMAT system call in accordance with the present method. When the SHM_MAP flag is specified, the data file associated with the specified open file descriptor is mapped to the address space of the calling process. When the file has been successfully mapped, the segment start address of the map file is returned. The data file to be mapped must be a regular file residing on the secondary storage device. Optional flags may be supplied with the "SHMAT" system call to specify how the file is to be mapped. The different way in which the files are to be mapped correspond generally to those available in the basic UNIX system, namely read-only, write-only, copy-on-write (SHM_COPY).

All processes that map the same file, read-only or read-write, map to the same virtual memory segment. This segment remains mapped until the last process mapping the file closes it. All processes that map the same file copy-on-write, map to the same copy-on-write segment. Changes to the copy-on-write segment do not affect the contents of the file resident in the file system until specifically requested to do so by the user, by issuing a special command referred to as "fsync." If a process requests copy-on-write mapping for a file and the copy-on-write segment does not yet exist, then it is created, and that segment is maintained for sharing until the last process attached to it, detaches it with a close system call, at which time the segment is destroyed. The next request for a copy-on-write mapping for the same file causes a new segment to be created for the file.

A file descriptor can be used to map the corresponding file only once. A file may be multiply mapped by using multiple file descriptors (resulting from multiple "open" system calls), however, a file cannot be mapped both read-write and copy-on-write by one or more users at the same time.

A general system flow for a mapped file reference is described for the following scenario. In this scenario, the application attempts to reference a data area in a file which is not currently in memory. This reference causes a memory fault, and the process which is running the application is placed in a wait stage. The Virtual Resource Manager allocates a page in memory for the new data. It then determines what physical address the data resides at on disk, from the file map created earlier for the file by the map file services function. A start I/O operation is initiated to disk, the disk adapter primes the memory location with the 2K byte data block from the file, and an interrupt is issued to the virtual machine, i.e., the UNIX kernel, which does a context switch to permit the operating system to take control. The process is made dispatchable, and the operating system kernel then returns control to the Virtual Resource Manager, which then re-dispatches the process. When a file is mapped onto a segment, the file may be referenced directly by accessing the segment by load and store instructions, as previously indicated. The virtual memory paging system automatically takes care of the physical I/O. However, references beyond the end of the file cause a problem as do references to so-called "holes" in the file which exist because the segment is a sparse-type file or a portion of the file has been intentionally deleted.

Since the map that was created by the Map Page Range service reflects actual storage locations on the secondary storage device that have been assigned on the basis of the size of the object that is to be stored in the segment; only the approximate number of virtual addresses that are needed to store the object are actually assigned. In creating the segment, virtual addresses are assigned in blocks which, in the preferred embodiment, were 64K blocks. If the file expands beyond the 64K border, a problem is created since there is an unmapped area of virtual memory. A similar situation arises when the virtual address range assigned to store an object does not include contiguous virtual addresses. The so-called "hole" in the virtual address range is not mapped since no physical space on the secondary storage device has been allocated. If an application addresses a virtual address that lies in the hole, the page fault cannot be serviced. Also, addresses beyond the current end of the file, but within the 64K block boundary, must also be taken care of since pages at these addresses require a change in status to be recorded.

In accordance with the present invention, an improved method for overcoming these problems is provided.

SUMMARY OF INVENTION

In accordance with the method of the present invention, an attempt by an application to address a virtual page after a file has been opened and the file mapped to another segment is treated as a protection exception. In one situation, the virtual page address of the desired page is greater than the current segment size, but still within the segment boundary, since address space is allocated in 64K blocks. In creating a segment, the size, in terms of the number of pages or page addresses, is determined by the actual number of page addresses required. The remaining pages up to the next 64K boundary are protected by a flag from being written into.

In the other situation, the requested page address is beyond the 64K boundary.

Both situations are handled as a protection violation. In the first situation, where the address is not beyond the 64K boundary of the segment, pages are allocated by a supervisory call of the UNIX kernel and one or more disk blocks are allocated from a list of available blocks. The Map Page Range service then extends the range of the mapped segment. In the second situation involving an address beyond the current boundary but below the maximal permissible segment size, the size of the mapped segment is increased in 64K blocks, up to the needed size. Pages within the last 64K block which are not used for the file are again protected.

It is therefore an object of the present invention to provide an improved method for use in a page segmented virtual memory data processing system for increasing the size of a segment automatically, in response to a request for a virtual page whose address is greater than the segment size.

Another object of the present invention is to provide an improved method for use by a page segmented virtual memory system to automatically increase the number of virtual pages that were initially assigned in the segment and the number of corresponding storage blocks on a secondary storage device that were initially assigned in response to a request by an application process for access to a virtual page address that is beyond the address range as initially established.

Objects and advantages other than those mentioned above will become apparent from the following description, when read in connection with the drawing.

DESCRIPTION OF THE PREFERRED EMBODIMENT

Figure 1:
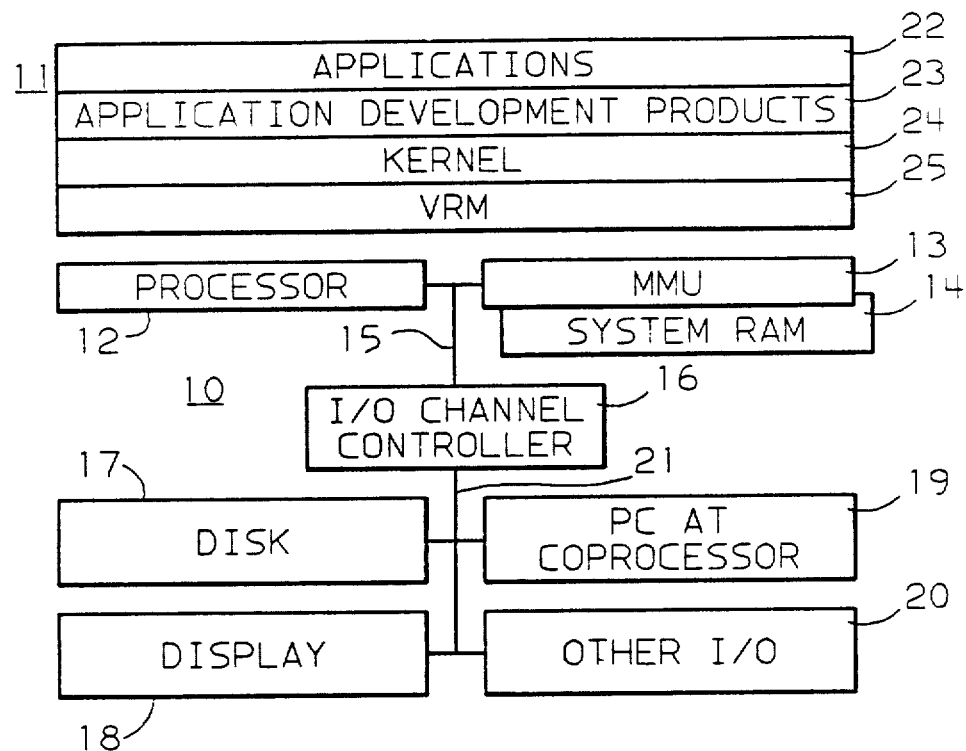
FIG. 1 is a schematic illustration of a virtual memory system in which the method of the present invention may be advantageously employed.

System Overview: FIG. 1 is a schematic illustration of a virtual memory system in which the method of the present invention is employed. As shown in FIG. 1., the system comprises a hardware section 10 and a software or programming section 11. Hardware section 10, as shown, comprises a processor function 12, a memory management function 13, a system memory function or RAM 14, system bus 15, an Input/Output Channel Controller (IOCC) 16, and an Input/Output bus 21. The hardware section further includes a group of I/O devices attached to the I/O bus 21 through the IOCC 16, including a disk storage function 17, a display function 18, a co-processor function 19, and block 20, representing other I/O devices such as a keyboard or mouse-type device.

The program section of the system includes the application program 22 that is to be run on the system, a group of application development programs 23, or tools to assist in developing new applications, an operating system kernel 24, which, for example, may be an extension of the UNIX system V kernel, and a Virtual Resource Manager program 25, which functions to permit a number of virtual machines to be created, each of which is running a different operating system, but sharing the system resources. The system may operate, therefore, in a multi-tasking, multi-user environment which is one of the main reasons for requiring a large virtual memory type storage system.

Figure 2:
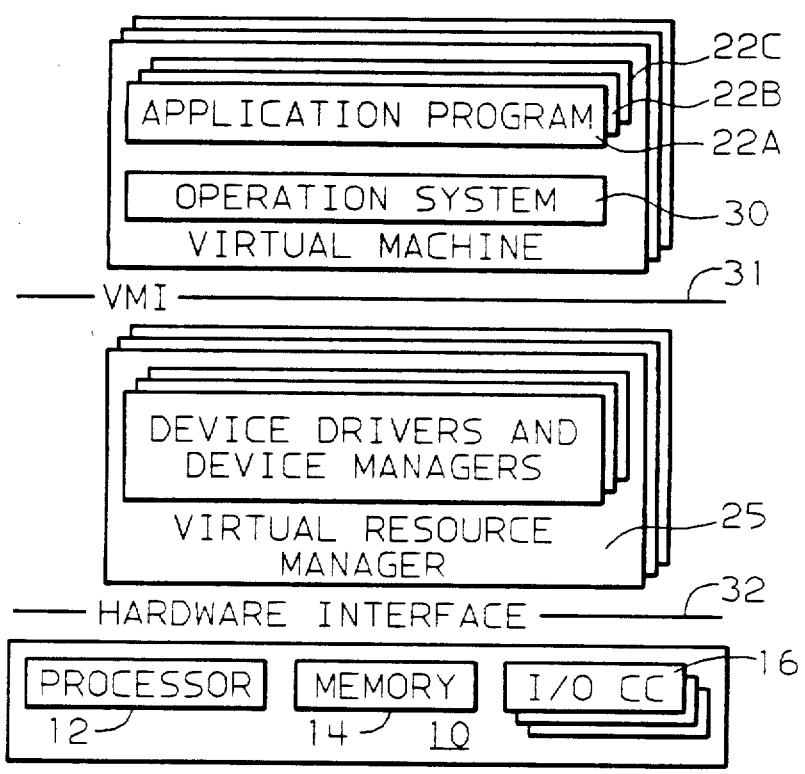
FIG. 2 illustrates the interrelationship of the Virtual Resource Manager shown in FIG. 1 to the data processing system and a virtual machine.

FIG. 2 illustrates the relationship of the Virtual Resource Manager 25 to the other components of the system. As shown in FIG. 2, a virtual machine includes one or more application programs such as 22a–22c and at least one operating system 30. A virtual machine interface 31 is established between the virtual machine and the VRM 25. A hardware interface 32 is also established between the VRM 25 and the hardware section 10. The VRM 25 supports virtual memory. It can be assumed, for purposes of explanation, that the memory capabilities of the hardware shown in FIG. 1 includes a 24 bit address space for system memory 14, which equates to a capacity of 16 megabytes for memory 14, and a 40 bit address space for virtual memory, which equates to 1 terabyte of memory. A paged segmentation technique is implemented for the Memory Management Unit 13, so that the total virtual address space is divided into 4,096 memory segments, with each memory segment occupying 256 megabytes.

Figure 3:
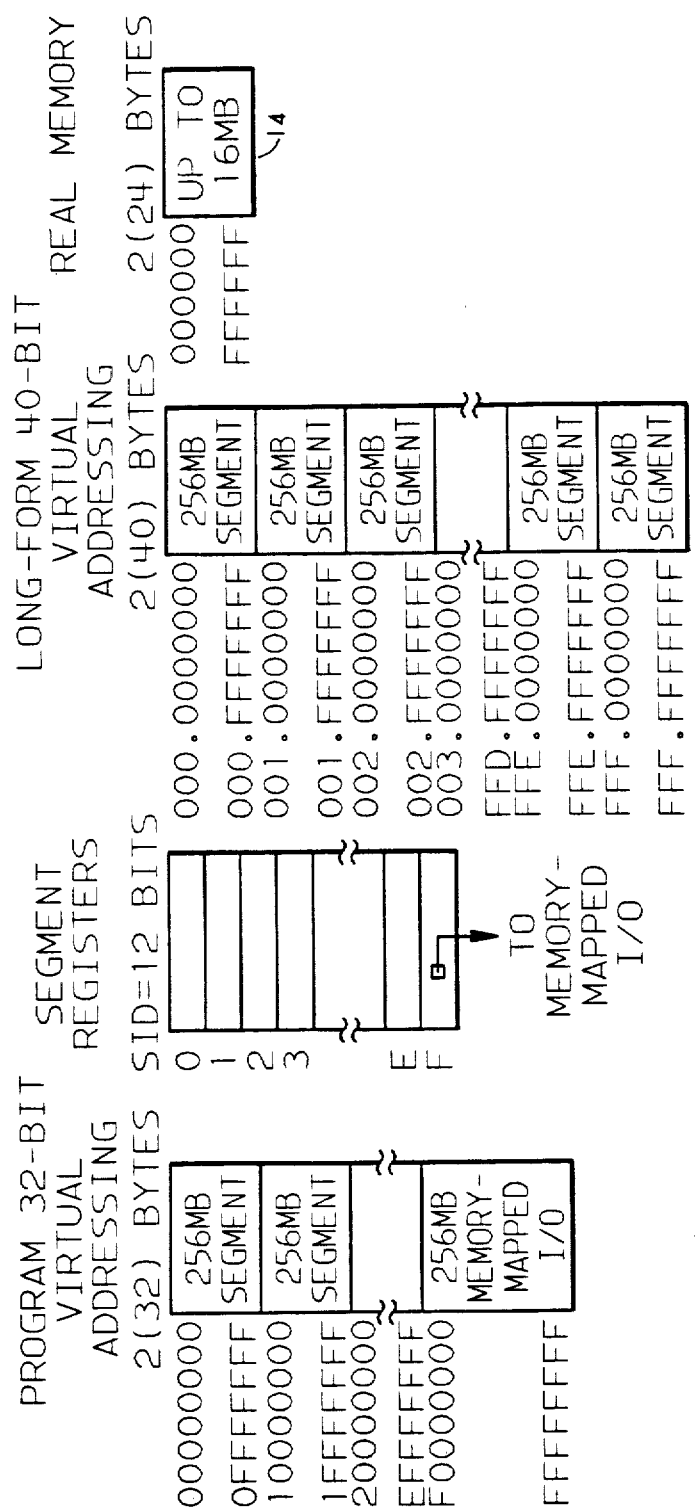
FIG. 3 illustrates the virtual storage model for the system shown in FIG. 1.

FIG. 3 illustrates the virtual storage model. The processor 12 provides a 32 bit effective address which is specified, for example, by the application program. The high order 4 bits of the 32 bit address functions to select 1 of 16 segment registers which are located in the Memory Management Unit (MMU) 13. Each segment register contains a 12 bit segment ID section, along with other special control-type bits. The 12 bit segment ID is concatenated with the remaining 28 bits of the initial effective address to provide the 40 bit virtual address for the system. The 40 bit virtual address is subsequently translated to a 24 bit real address, which is used to address the system memory 14.

The MMU 13 utilizes a Translation Look-aside Buffer (TLB) to contain translations of the most recently used virtual addresses. Hardware is used to automatically update TLB entries from main storage page tables as new virtual addresses are presented to the TLBs for translation.

Figure 4:
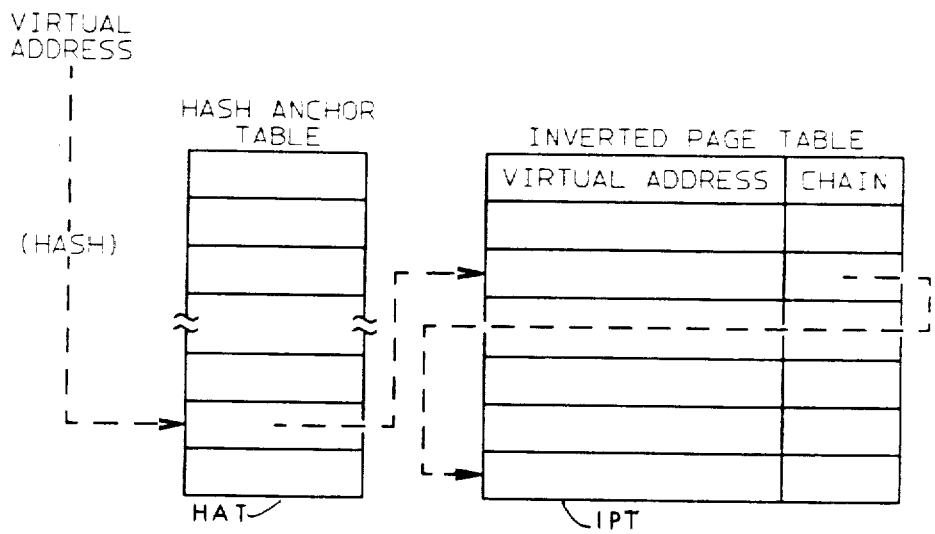
FIG. 4 illustrates conceptually, the address translation function of the system shown in FIG. 1.
Figure 5:
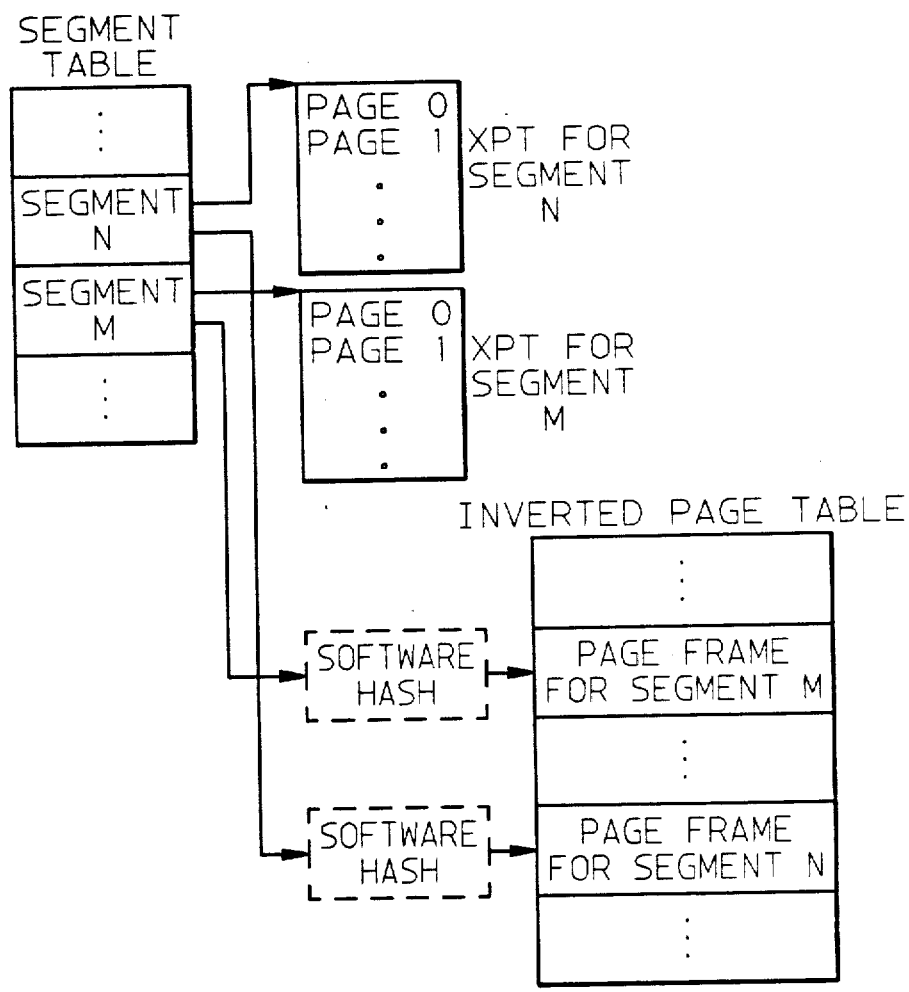
FIG. 5 illustrates the interrelationships of some of the data structures employed in the system of FIG. 1.

FIG. 4 illustrates conceptually, the TLB reload function.

The 40 bit virtual addresses are loaded into the TLB by looking them up in an Inverted Page Table (IPT), as shown in FIG. 4. The table is "inverted" because it contains one entry for each real memory page, rather than one per virtual page. Thus, a fixed portion of real memory is required for the IPT, regardless of the number of processes or virtual segments supported. To translate an address, a hashing function is applied to the virtual page number (high order part of the 40 bit virtual address, less the page offset) to obtain an index to the Hash Anchor Table (HAT). Each HAT entry points to a chain of IPT entries with the same hash value. A linear search of the hash chain yields the IPT entry and, thus, the real page number which corresponds to the original 40 bit virtual address. If no such entry is found, then the virtual page has not been mapped into the system, and a page fault interrupt is taken.

The function of the Page Fault Handler (PFH) is to assign real memory to the referenced virtual page and to perform the necessary I/O to transfer the requested data into the real memory. The system is, thus, a demand paging type system.

When real memory becomes full, the PFH is also responsible for selecting which page of data is paged out. The selection is done by a suitable algorithm such as a clock page replacement algorithm, where pages are replaced based on when the page was last used or referenced. Pages are transferred out to disk storage.

Virtual Memory Manager Data Structures: The characteristics of the Virtual Memory Manager data structures will now be described.

Segment Table: The Segment Table (SIDTABLE) contains information describing the active segments. The table has the following characteristics. The table is pinned in real memory and its size is predetermined. It must be word-aligned in memory, and the segment table must be altered in a paging subsystem critical section.

External Page Table: The External Page Table (XPT) describes how a page is mapped to the disk. There is one XPT entry for each defined page of virtual memory. The XPT entries for a segment are allocated as continuous entries when the segment is created. The XPT entries for a small segment, that is one that is less than 1 megabyte, do not cross an XPT page boundary. The XPTs for a large segment, those larger than 1 megabyte, are aligned at the start of an XPT page. The XPT entries are allocated in units of 32 entries which will map 65,536 bytes (64K) of virtual memory. Each entry requires 4 bytes. The table has the following characteristics. Only XPT root entries must be pinned into memory. Its size is predetermined, and it must be word-aligned. The virtual page number is the index into the XPT table. The XPT must be altered only in a Paging Subsystem critical section.

Inverter Page Table: The Inverted Page Table (IPT) describes the relationship between virtual addresses and real addresses, as discussed previously. The IPT consists of two arrays. The first one is primarily defined by the memory management unit, and contains the information that controls the translation function. The second array contains the Paging Subsystem page state information, used to control page fault processing. This array has the following characteristics. It is pinned, and its size is determined by the real memory size which is set at the Initial Program Load time (IPL). It is aligned according to real memory size. The real page number is the index into the IPT. Like the previous structures, it must be altered in a Paging Subsystem critical section.

Each real page frame has an entry in the IPT. All pages are on one of three lists.

There is one main list for each valid segment. It is doubly linked and anchored in the segment control block. This list links together all of the page frames assigned to the segment with a valid virtual address, and for which there may be a valid Translation Look-aside Buffer (TLB) entry.

There is one system-wide free list that links together the page frames that may be reassigned. This doubly linked, circular list is anchored in the IPT entry for page one. Pages on this list do not have a valid TLB entry, and accesses to them will always result in a page fault. Pages may be on both the main list and free list. This is done so that the pages may be released without searching the free list. Unnamed (unhashed) pages are put at the head of the list, and named (hashed) pages are put at the tail.

There is one system-wide I/O list that links together all of the pages currently being read or written to the disk. This doubly linked, circular list is anchored in the IPT entry for page two. Pages on this list do not have a valid TLB entry, and accesses to them will also result in a page fault. There must be only one page I/O list to ensure that I/O is processed first-in, first-out by block, even if non-first-in, first-out disk scheduling is performed.

Notification Control Block: A Notification Control Block (NCB) contains the information required to notify a virtual machine of the completion of an asynchronous paging request. The asynchronous request can be either a purge page range Service Call (SVC), or a page fault when asynchronous acknowledgement is allowed. An NCB is a self-describing control block in the system control block area. Its identifier field can be used to differentiate it from other types of control blocks in the system control block area. This is required since NCBs are queued on the same list as Process Control Blocks (PCBs). An NCB is pinned and allocated in the system control block area when needed. Like the previous structures, it must be altered in a Paging Subsystem critical section. An NCB is only allocated when the Page Fault Handler is performing a function on behalf of a process and, therefore, will not cause the system to abnormally terminate due to insufficient system control blocks.

Page Fault Wait Lists: The Virtual Memory Manager can place a process either internal or virtual machine on one of three circular wait lists.

There is one page I/O wait list for each frame in the system. A page's I/O wait list is anchored in the page's IPT entry and links together the Process Control Blocks (PCBs) of the processes synchronously waiting for I/O to complete to the page, and the NCBs of the processes asynchronously waiting for I/O completion notification. A process is placed in a page's I/O wait list when it reclaims the page with I/O in progress or it initiates a page in I/O as a result of a page fault.

There is one global system free page frame wait list. It links together the PCBs or NCBs for the processes that are waiting for a free page frame. This list is processed first-in, first-out. A process is placed on this list when it requires a free page frame and there is not one available. The processes' PCB is enqueued on the list for synchronous waits and an NCB is enqueued on the list for asynchronous waits. Lastly, there is one global system page I/O wait list. It links together the PCBs or NCBs for the processes that are waiting for all page out I/O less than or equal to a specific page I/O level. This list is sorted by a page I/O level. A process is placed on this list by several of the Virtual Memory Manager service calls to ensure that the contents of the disk match the contents in memory. A PCB is enqueued on the list for synchronous requests or an NCB is enqueued on the list of asynchronous requests. Note that with non-first-in, first-out disk scheduling, the page I/O level may result in the process waiting longer than is required.

Paging Mini-Disk Table: The paging mini-disk table controls the translation of Virtual Memory Manager slot numbers into the mini-disk I/O Device Number (IODN) and logical block number. The number of entries in this table define the maximum number. The number of entries in this table define the maximum number of mini-disks that the Virtual Memory Manager can perform paging operations to. This array has the following characteristics. It is pinned, its size is predetermined, and it is word-aligned. The paging space mini-disk entries are allocated at system initialization and must be the first entry/entries in the table. Mapped page range service calls allocate an entry for mapped mini-disks. The most significant bits of the disk address are the index into this table. As in the previous data structures, it must only be altered in a Virtual Memory Manager critical section.

Disk Allocation Bit Map: The Virtual Memory Manager maintains a bit map for each paging space mini-disk. Each bit indicates if its page is allocated or free. Bad slots are marked as allocated when the mini-disk is opened at system initialization. This array has the following characteristics. It is not pageable, the paging space is allocated at page out time, the least significant bits of the disk address are the index into this array, and as with the previous structures, it must be altered only in a Virtual Memory Manager critical section.

Paging Device Extensions: One Paging Device Extension (PDX) exists for each paging space that the Virtual Memory Manager supports. A PDX is an extension for a paging space entry in the paging mini-disk table. The Virtual Memory Manager manages paging space and the PDX is what is used to guide it in that management. The attributes of the PDX are; it is pinned and it is allocated from the system control block area at system initialization. It is linked together in a list and anchored by a global pointer, and as previous structures, it must be altered only in a Virtual Memory Manager critical section. PDXs are not dynamically allocated. System initialization allocates all PDXs and initializes them.

Page Fault Processing: Synchronous page fault processing is the traditional type of page fault processing. In this operation, the faulting process is forced to wait until the I/O required to resolve the page fault is complete. The Virtual Memory Manager restarts the process at the completion of each I/O request. When redispatched, the process will either page fault, in which case additional I/O will be scheduled to resolve the fault, or will not page virtual machine receives a "page fault cleared" machine communication interrupt so that it can put its faulting task back on its ready task list. This allows page faults to be processed asynchronously with respect to the execution on the virtual machine. The virtual machine can force synchronous page fault processing by disabling page fault notification. It should be noted that page fault cleared interrupts cannot be directly disabled by a virtual machine. A page fault cleared interrupt is always given when the I/O is complete for a fault that has resulted in a page fault occurred interrupt. Page fault cleared interrupts can be indirectly disabled by disabling page fault occurred interrupts.

Synchronous Page Fault Processing: For synchronous faults, the Process Control Block (PCB) of the process that faulted is placed on either the page's I/O wait list or the free page frame list when the I/O is required. The process is placed on the page I/O wait list when the Virtual Memory Manager initiates I/O for the page or I/O for the page was already in progress. The process is placed on the free page frame list when there are no free page frames available to perform the I/O into.

Asynchronous Page Fault Processing: When an asynchronous page fault occurs, the faulting virtual machine is notified of the segment identifier it faulted on, and the virtual address rounded down to the nearest page boundary. It is important to note that notification is not given for the address that the virtual machine faulted on, but for that page. For example, if a virtual machine faults on addresses x'806', x'856', x'87E', it will get three page fault occurred notifications for x'800' and one page fault cleared notification for x'800'. A Notify Control Block (NCB) is allocated and chained to the page's I/O wait list when I/O is required. This is the same chain that PCBs are chained onto. The PCBs and NCBs are typed so it is possible to tell them apart. A PCB is chained for a synchronous fault and an NCB is chained for an asynchronous fault.

If the notification was given because of a page fault on the External Page Table (other than the original fault), then the Notification Control Block is chained off the IPT that the XPT is paged into, but the address of the original fault is in the Notification Control Block.

The free frame wait list case is a special case. The virtual machine is notified and its Notification Control Block is chained, first-in, first-out, onto the free frame wait list along with PCBs. The first page out that causes a frame to be freed-up when this NCB is at the head of the free frame wait list will cause notification to be given.

Page Fault Occurred Notification: A page fault occurred interrupt is generated by the page fault handler upon determining that an asynchronous fault has occurred and I/O is required. No internal VRM queue element is required to perform this function. The page fault handler actually swaps the virtual machine's (PSB) and execution level. The premise that allows this is that page faults on machine communications or program check levels are processed synchronously, without notification. This implies that the interrupt does not need to be queued because the virtual machine can always take page fault occurred interrupts.

Page Fault Cleared Notification: When the I/O for a page fault is complete, the Virtual Memory Manager will be called to clean up. The page fault complete interrupt is queued to the virtual machine by the VRM queue management function. This implies the need for a queue element. The Notification Control Block is used for that function.

Asynchronous Page Fault Scenario: A page fault is considered complete when each I/O it generates completes. A virtual machine will get 'n' total page fault occurred interrupts, and 'n' page fault complete interrupts for a page fault that requires 'n' I/Os to satisfy. Example (n=3 here): Assume that the virtual machine faults asynchronously on a page that exists, but is not in memory, there are no free frames in memory to page it into, and the virtual memory manager faults on the XPT for the original page. The following lists the order of events (Note that this scenario is not the typical case):

1. VM Page Faults
2. VMM Enqueues Page out requests to build up free page frame list
3. VMM Notifies virtual machine of Original Page Fault VM is Dispatched (presumably it will task switch or wait)
5. Page out I/O completes
6. VMM Notifies virtual machine that the original Page Fault is resolved
7. VM is Dispatched
8. VM Page Faults again on the same address
9. VMM Page Faults on XPT
10. VMM Enqueues Page in request for that XPT
11. VMM Notifies virtual machine of Original Page Fault
12. VM is Dispatched (presumably it will task switch or wait)
13. The XPT Page in I/O completes
14. VMM Notifies virtual machine that the original Page Fault is resolved
15. VM is Dispatched
16. VM Page Faults again on the same address
17. VMM Enqueues Page in request for the page faulted on
18. VMM Notifies virtual machine of the Page Fault
19. VM is Dispatched (presumably it will task switch or wait)
20. The Page in I/O completes
21. VMM Notifies virtual machine that the original Page Fault is resolved
22. VM is Dispatched Purge Page Range Notification: There is another way in the system to get a notification of I/O complete from the Virtual Memory Manager. This is on the asynchronous forced write option of the Purge Page SVC. One machine communications interrupt is presented to the virtual machine upon completion of the I/O for the Purge. Like page fault complete interrupts, this is given to the virtual machine, regardless of whether the virtual machine enables page fault notification.

The way it works is an NCB is chained on the page I/O level wait list, along with PCBs. In the NCB is marked the page I/O level that must be achieved before the purge I/O can be considered complete. When that page I/O level is attained, the virtual machine will be notified.

Page Fault Handler: A large function of the page fault handler, namely the way it handles synchronous and asynchronous page faults is discussed in "Page Fault Processing." In the fowllowing section, where statement are made such as: "the faulter is notified," this means that if the faulter faulted asynchronously, it is notified, otherwise it is un-readied, as per previously described rules. This section describes the actual process that the page fault handler goes through to resolve a fault.

The page fault handler runs as an extension of the program check handler, at a lower interrupt level; below all interrupting devices. It runs in a back-track state, thus allowing it to page fault on the Virtual Memory Manager data structures.

When the page fault handler is entered, it immediately saves information about the fault, such as the virtual address. The reason that it does this is, if it page faults within itself, and that fault needs to do I/O, the page fault handler must know what address to give to the virtual machine for asynchronous notification. This implies that no page faults are allowed in the window between where the page fault handler has been backed out because of a page fault and where it is called again to service its own fault.

There are several important steps into which the page fault handler may be broken into:

Page Reclaim

If the page can be reclaimed, then the page fault handler is done. If page in or page out I/O is in progress to the page, then the faulter is chained onto the page's I/O wait list. Upon completion of the I/O, a test is made to see if any process is waiting on the frame and if so, it is notified. Reclaim, therefore, is split across the page fault handler and page fault end. If the page is on the free list, then the faulter is re-dispatched after the page frame is made accessible. The faulter is not notified or forced to wait.

Building up the Free Page List

If the free list is found to be below a lower threshold, then page outs are initiated to build it up to an upper threshold. These thresholds are system tuning parameters. If the free list is still empty after attempting to replenish it, then the faulter will be notified of the original fault.

Clock with second chance is the technique used to select pages to be replaced.

Processing the Fault The page fault handler involves itself with most of the Virtual Memory Manager structures, but most importantly, it examines the XPT for the page faulted on, and the page fault handler may fault at this time. It also allocates a paging space diskk slot for the page.

Page Fault End: This procedure handles all I/O completion interrupts for the Virtual Memory Manager. It is scheduled for execution by the queue manager when the hard file device driver dequeues a Virtual Memory Manager request. Note that execution of this routine is delayed until the completion of any preempted Virtual Memory Manager critical section. Page fault cleared notification is given by this procedure according to the rules set in "Page Fault Processing." This procedure may not page fault and, therefore, no references are allowed to XPTs or other pageable data structures. There are two types of I/O that can complete for the Virtual Memory Manager.

Page in

Page out

All processes waiting on the frame are readied/notified. Also, the page I/O level is updated. This is a count of all the I/O operations that have completed. All processes waiting on a page I/O level less than or equal to the updated page I/O level are readied-notified when the oldest I/O operation completes. The frame is made accessible by validating the IPT tag word for all page in completions and reclaimed page out completions of an unreleased page. Otherwise, the frame is placed on the free list.

This procedure attempts to replenish the system control block area when the number of free system control blocks is below its upper threshold and a free frame exists. All processes waiting on a free system control block are then readied. This procedure is also responsible for waking up processes waiting for a free frame. A free frame is assigned to the process that has been waiting the longest for a free frame. This processes is then notified/readied.

Paging Space: The Virtual Memory Manager supports paging to one or more paging spaces. Currently, the only paging device supported is a hardfile, however, the design has been made relatively flexible in this area for future expansion. A requirement of all paging spaces is that they be formatted for 512 byte blocks.

Paging Space Initialization: All paging spaces MUST be known to the Virtual Memory Manager at system initialization. If a user creates a paging space using the Mini-disk Manager, then, before the Virtual Memory Manager will page to it, the system must be re-IPLed, or reinitialized. The reason for this is that system initialization is the only time that the Virtual Memory Manager paging space data structure are built. All paging spaces, as well as the disk allocation bit map are set up at Mini-disk Manager initialization time. The Mini-disk Manager queries all mini-disks, and when it find a paging space mini-disk, it calls a routine which effectively "defines" a paging space to the VMM. Before calling the define paging space routine, the Mini-disk Manager opens the paging mini-disk (it will be left open). The way that the define paging space routine works is as follows:

1. Allocate a PDX for the paging space.
2. Initialize the PDX.
3. Initialize the paging mini-disk table.
4. Insert the new PDX onto a linked list of all existing PDXs.
5. Each PDX is made to point to its paging mini-disk table entry and vice versa.
6. Set up the disk allocation bit map (temporary disk map for this paging space.

There is one disk allocation bit map, and it is partitioned among all paging spaces. The reason for having one bit map, rather than multiple, is that by packing paging spaces into one bit map, it will improve the locality of reference to the bit map. The XPTs for the bit map are set such that the bit map is initially all logically zero. If a paging space is not a multiple of 64K, then system initialization rounds the size up to the next 64K boundary, and marks the blocks (bits) in between as allocated. This requires the ability of system initialization to take a first reference page fault at this time.

After defining a paging space, the Mini-disk Manager then checks for bad blocks on the paging space. If a bad paging space block is found, the Mini-disk Manager will call a routine to mark the bad paging spaces as allocated in the Virtual Memory Manager temporary disk map. This way, the Virtual Memory Manager will never use them. The Mini-disk Manager will then do bad block relocation on that paging space in the future.

Paging Space Management: Paging disk blocks are allocated one at a time, in a circular fashion per paging space. A pointer is kept to the last place allocated at in each paging space. On the next allocation in that particular paging space, the search for an empty slot starts at the last allocated slot and incrementally runs through the paging space (wrapping around at end). The idea behind allocating in this fashion is to improve page out affinity, and page ahead. The circular pointer through a paging space can be thought of as pointing to the "oldest" spot on that paging space, or, in other words, the spot that was written out the longest ago. It is a reasonably good probability that that disk slot will be free now (since it was allocated a long time ago). All disk slots are allocated at page out time, so if a large purge page range is performed, causing a lot of slots to be allocated at once, this will allocate them close together. This is assuming that the purge is being done to page out a working set of a particular process, or entity in the virtual machine. When that process becomes active again, its working set is close together on disk, minimizing arm movement, and maximizing page ahead efficiency.

In the presence of more than one paging space, they each, individually, behave as previously described. The Virtual Memory Manager disk allocation will decide which paging mini-disk to allocate a block to. The disk scheduler will keep track of where the disk arm is (approximately). The Virtual Memory Manager utilizes this by attempting to allocate on the paging space whose point of last allocation is closest to where the disk arm is (for all disks).

Virtual Memory Manager SVCs: The Virtual Memory Manager SVCs all execute as extensions of the virtual machine. These SVCs can result in explicit I/O such as a page out of a purged page or implicit I/O such as page faults on code, stack, or data. All I/O for synchronous SVCs will place the virtual machine in a synchronous page fault wait state until the I/O is complete. Only implicit I/O for asynchronous SVCs will place the virtual machine in a synchronous page fault wait state until the I/O is complete. Explicit I/O will be initiated and the virtual machine notified upon completion.

Special Program Check Error Processing: Program check errors that occur while executing code within a virtual machine are reported to the virtual machine via a program check virtual interrupt. Program check errors that occur while executing within the VRM result in an abnormal system termination. VRM SVCs execute within the VRM and perform functions on behalf of a virtual machine. Therefore, the program check handler looks at a value in low memory to determine if errors that occur within VRM SVC code are to be reported to the virtual machine as a program check virtual interrupt with the old IAR specifying the SVC or if the errors are an abnormal system termination.

Selected VMM SVCs use this facility to save path length by not checking for error conditions when accessing parameter lists. The program check handler performs the error recovery for them.

Virtual Memory Manager Services: All Virtual Memory Manager services execute synchronously with respect to the caller. Several of these services can result in page faults in which case the process of the caller is forced to wait for the page fault to be resolved.

Asynchronous vs. Synchronous Page Faults: The VRM supports both synchronous and asynchronous page fault processing for virtual machines. With synchronous page fault processing, the entire virtual machine is forced to wait until the page fault is resolved. With asynchronous page fault processing, the virtual machine is allowed to dispatch other tasks. Only the faulting task is forced to wait until the page fault is resolved. Because of this, any operation that results in synchronous page fault processing will tend to lower the number of concurrent tasks that can be executed while any operation that results in asynchronous page fault processing will tend to maximize the number of concurrent tasks that can be executed.

Figure 6:
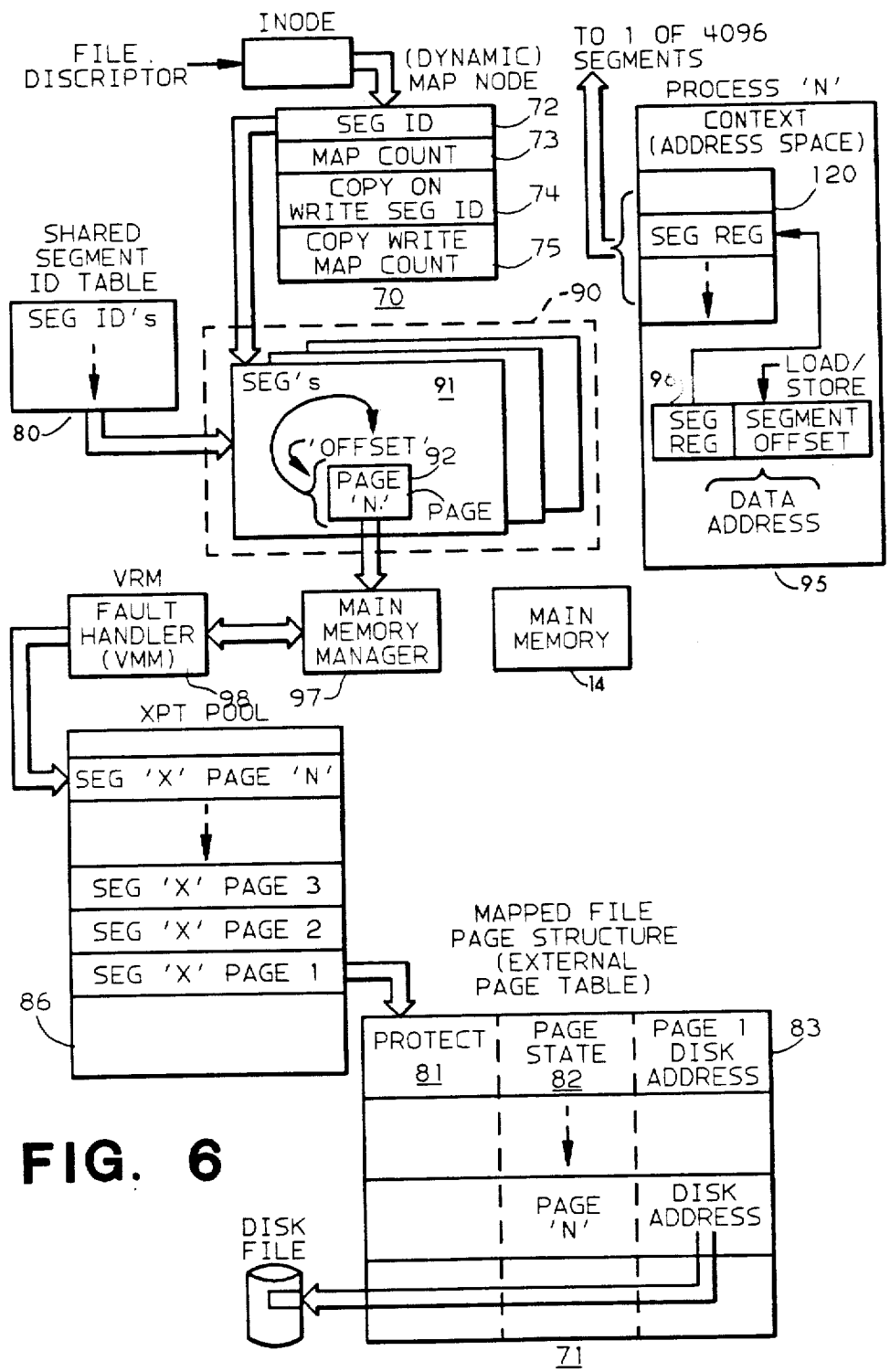
FIG. 6 illustrates the interrelationship of a number of data structures to the Virtual Resource Manager, the virtual memory, and real memory.

FIG. 6 illustrates two additional data structures that are uniquely associated with the Map Page Range services which incorporates the method of the present invention. The first data structure is map node 70, which is dynamically created when a file is to be mapped and the mapped file page structure 71, which resembles the general format of an External Page Table (XPT), discussed earlier.

The map node 70 as shown in FIG. 6, includes four fields designated 72-75. Field 72 is designated the segment ID and functions to store the segment identifier that is to be used to store the mapped file. The field designation 73 is the map count field which functions to keep track of the number of users who have concurrently requested that the file be mapped, other than copy_on_write type of mapping. Field 74 of map node 70 is designated the CW segment ID or the copy_on_write segment ID which identifies the unique segment ID that is used exclusively for the copy_on_write segment. Field 75 is the copy_on_write map count field which functions to keep track of the number of users who are sharing this copy_on_write segment.

The data structure 80 is a specific section of the segment table used to store the segment ID segments that are being shared by more than one user.

The mapped file page structure 71 is similar to an XPT, in that it includes an entry for each page of the file that is mapped. Entries, as shown in FIG. 6, include a protection field 81, a page status field 82, and a disk address field 83. The mapped file page structure is allocated from the XPT pool 86, shown diagramatically in FIG. 6.

The dotted line block label 90 represents virtual memory. Segments of the memory addressable by the segment registers are designated 91, while the page of a segment is designated by reference character 92.

Block 95 represents a process running in the system. Block 96 represents a list of segment identifiers for segments associated with the running process. These IDs are loaded into appropriate segment registers when the process "n" has its turn on the system. The 32 bit effective address is converted to a 40 bit virtual address consisting of a 12 bit segment identifier and a 28 bit offset, as explained earlier in the application. The 12 bit segment ID is provided by one of the 16 bit segment registers that was selected by the 4 high order bits of the 32 bit effective address.

The VRM includes a fault handler which includes two separate functions represented by blocks 97 and 98, respectively, in FIG. 6. Block 97 functions to address system memory and provide the block 98 with a page fault interrupt when the requested page is not in main memory. Block 98 functions to resolve the page fault through access to the mapped file page structure since it contains the disk address in field 83, as described earlier.

Figure 7A:
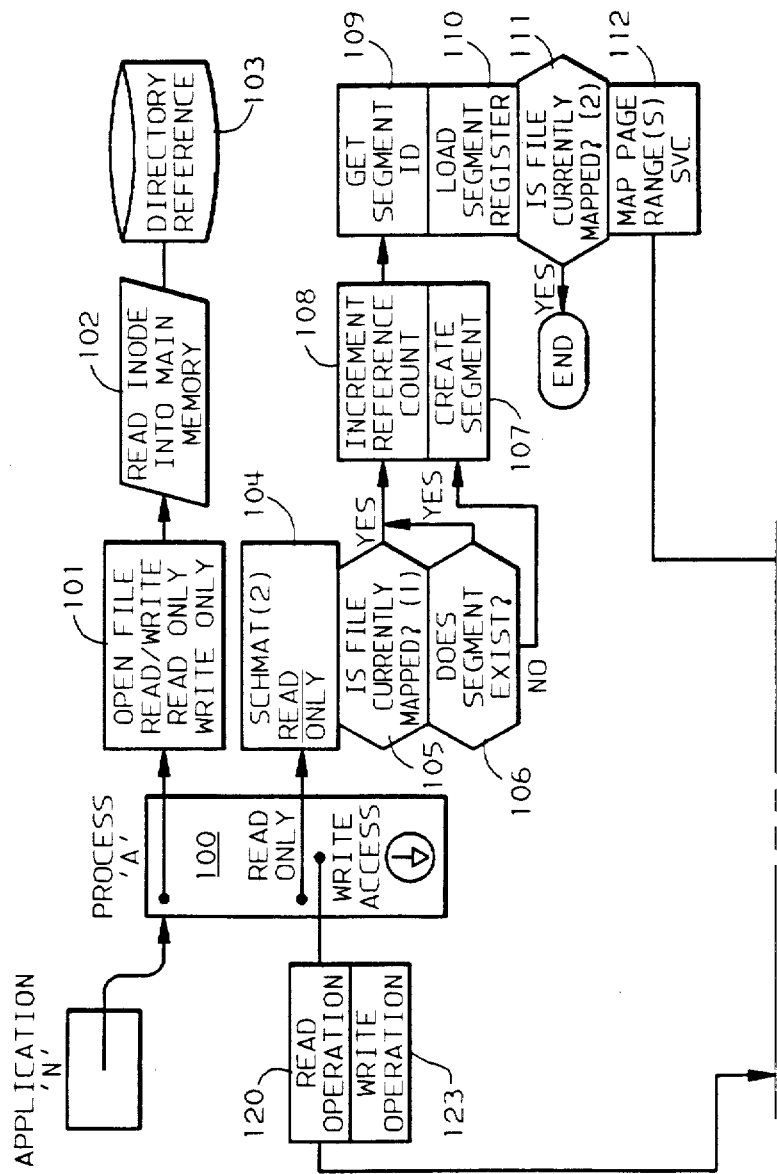
FIGS. 7a through 7c are flow charts, illustrating the various steps involved in mapping and accessing a file in response to various UNIX System Calls in accordance with the present invention.

FIG. 7a is a flow chart, illustrating the major steps involved in the system when an application process "n" performs various UNIX type System Calls. In block 100 the first system call is to open a file. Block 101 performs the open file operation. The file may be opened as a read/write file, read only file, or a write only file. Block 102 functions to read the inode into main memory from a directory reference 103 that is kept by the UNIX file management system.

Assuming that the file has been opened, the next system call is a SHMAT (2) read only call to block 104. Block 105 determines if the file is currently mapped by reference to the segment table. If the segment is not currently mapped, a test is made in block 106 to see if the segment has been created. If the segment has not been created, block 107 creates the segment. Block 108 functions to increment the referenced count in the segment count field. Block 109 functions to get the segment ID, while block 110 loads the segment register. If the segment is currently mapped, as determined by block 111, the addressing operation for the read system call is complete. If the file is not currently mapped, a Map Page Range service call is initiated to map the range of pages that are active in the system, as indicated by the file's External Page Table. Block 112 functions to create the map node 70 and the mapped file page structure 71, shown in FIG. 6.

The actual read operation, represented by block 120 checks to see if the file is mapped, as shown in block 121. If the file is not mapped, block 122 does a standard read operation. A similar operation is done for a write operation by block 123.

For either a read or write operation when the file is mapped, block 124 converts the file offset and length parameters of the UNIX System Call parameters to a segment and offset parameter. Block 125 gets the segment register ID from the shared segment table for the I/O operation if the system call is for a copy_on_write operation or a read/write operation. Block 126 tests to see if a write operation is involved and, if so, to allocate a new block on the disk file in block 127. If a write operation is not involved, block 127 is bypassed and block 128 does a copy between the disk and main memory. A block 129 then re-dispatches the process.

Figure 7B:
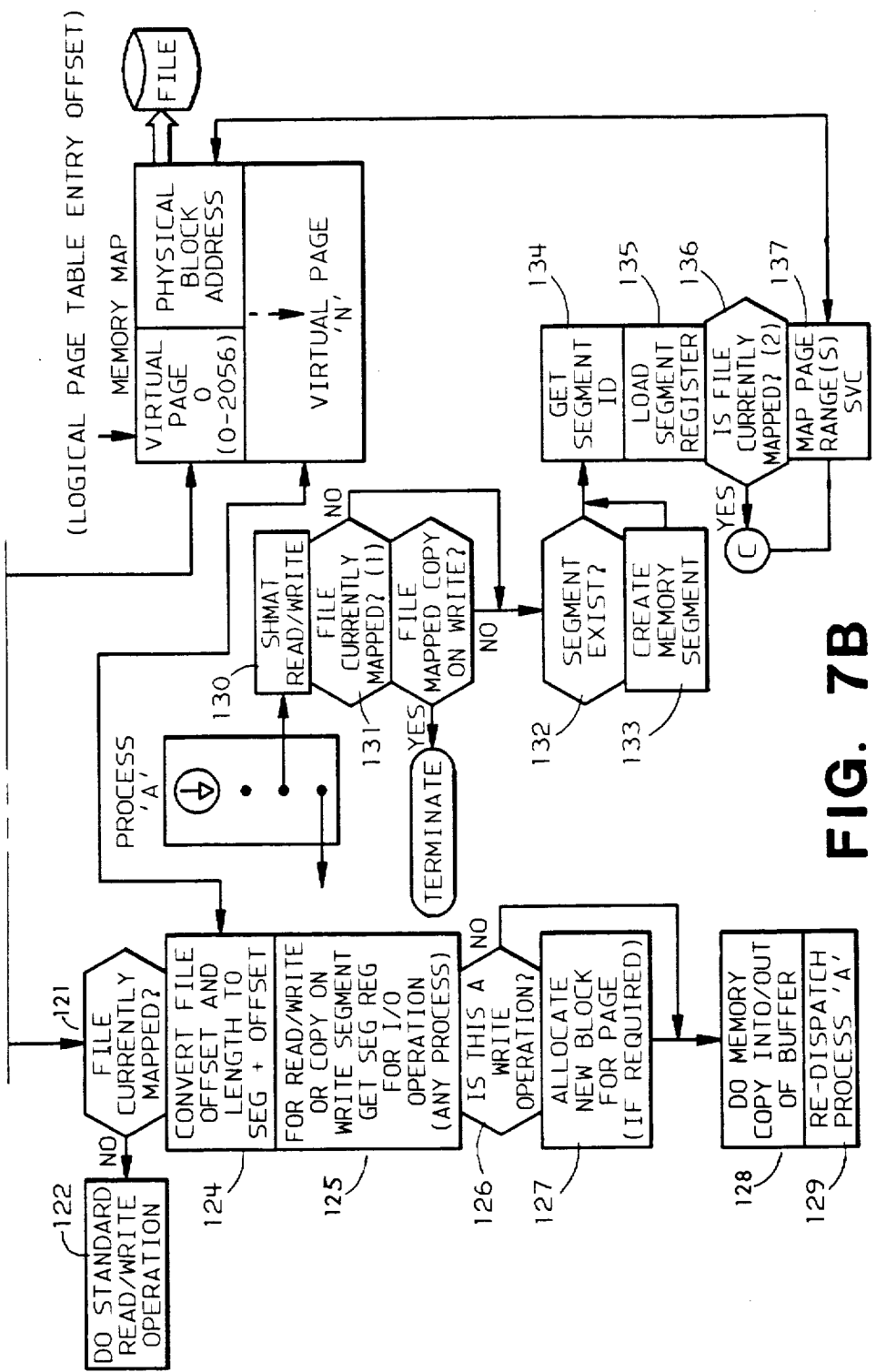

FIG. 7b illustrates Process A performing a SHMAT read/write system call, as indicated by block 130. Block 131 tests to see if the file is currently mapped for a read/write operation. If not, block 132 tests to see if the segment exists. If the segment does not exist, block 133 creates a memory segment for the mapped file, while block 134 and 135 get and load the segment register with the segment ID for the mapped file. Block 136 tests to see if the file is mapped and, if so, the function is complete. If the file is not currently mapped read/write, the Map Page Range service block 137 performs a page mapping to create the data structures 70 and 71 of FIG. 6.

Figure 7C:
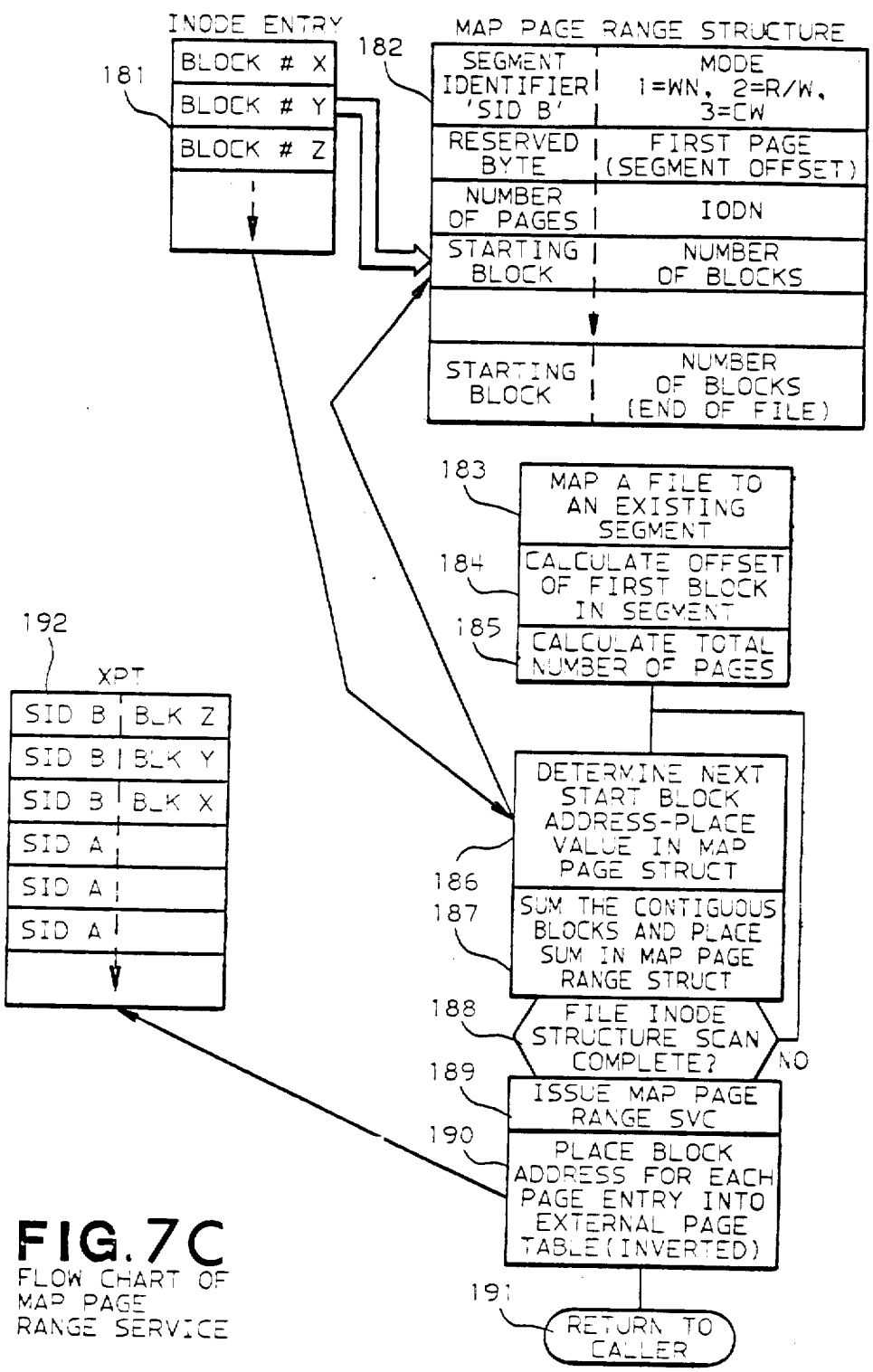

The major steps performed by the Map Page Range service block 112 or 137 are illustrated in FIG. 7c. After a segment has been created the file must be mapped into the segment. This is a dynamic operation, since the primary storage allocation is virtual, and the segment assignment is transient. As illustrated in FIG. 7c the inode structure 181 is read for the block address of each page to be allocated for the file. Each group of contiguously allocated blocks is summed, and the count recorded in the field adjacent to the starting block number 2 entry in the Map Page Range structure. Discontiguous blocks are reflected in discrete entries in the Map Page Range structure. When the entire file inode structure has been scanned, the Map Page Range SVC is issued and the external page table slot entries for the appropriate segment are updated with the block addresses for each page of the file.

Figure 8:
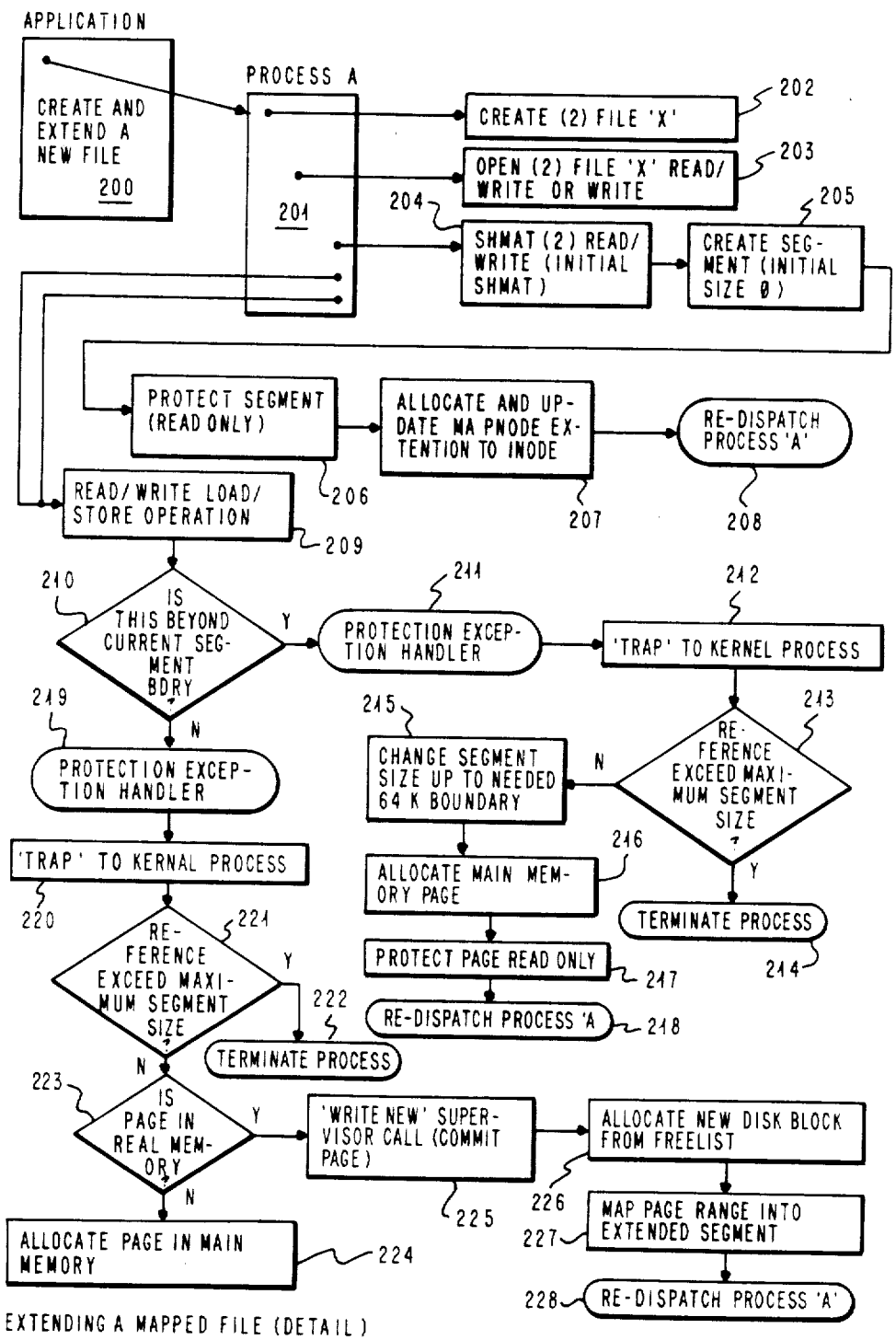
FIG. 8 is a flowchart, illustrating the steps involved in increasing the number of virtual pages in a segment of memory after it has been created.

FIG. 8 describes and illustrates the extending of a segment for a mapped file. The operation is as follows.

Block 200 represents an application program being executed on the system that is to create and extend a new file. Block 201 represents the application of block 200, executing a specific process which involves Creating a new file as represented in block 202. Subsequently, process A issues an Open System Call in block 203 to open file X in a Read/Write mode or a Write mode. The above described operations are normal conventional UNIX functions for creating and opening a file.

After the file is opened, process A issues a SHMAT Read/Write call to write to file X. This call results in the Create segment operation which assigns a segment ID to the file and protects all pages "read only" in block 206. No pages have been allocated at this point in the process, but the segment boundary has been established and the map node data structure updated in block 207. Process A is re-dispatched in block 208.

At some subsequent time, process A issues a Read/Write or load/store operation in block 209, specifying a virtual address which is checked in block 210 to insure that it is within the current segment boundaries. It will be assumed that the address is within the current boundary, but since the pages were previously protected in block 206, a protection exception routine in block 211 is called. This routine transfers control from the process back to the kernel of the UNIX operating system, as represented by block 212. A check is then made in block 213 to insure that the address is not beyond the maximum segment size permitted by the system. If it is, then the operation is terminated, as indicated in block 214. If the address does not exceed the maximum permissible size, block 215 changes the segment size in steps of 64K pages, up to the desired size. Block 216 allocates pages using main memory and block 217 protects all pages beyond the requested address up to the new boundary. The process is then re-dispatched, as indicated in block 218.

Blocks 19-22 correspond in function to blocks 211-214, but are illustrated in FIG. 8 to clarify the process flow. Block 223 checks to see if the requested page is in real memory. If not, block 224 allocates a page in main memory. If the page is not in real memory, a "write new" supervisory call is issued by the system in block 225, which allocates a new disk block from the free list, as represented in block 226. The process is re-dispatched in block 228, after the map range page segment is extended in block 227.

While the invention has been described and illustrated with respect to a specific embodiment, it will be appreciated by those persons skilled in the art, that changes and modifications may be made without departing from the spirit of the invention and the scope of the appended claims.

We claim:

1. In a page segmented virtual memory data processing system comprising,
 (A) a main memory,
 (B) a secondary storage device having a plurality of locations each of which stores a block of data comprising at least one virtual page, each of said locations having a different block address,
 (C) a UNIX type operating system (UOS),
 (D) an application program for processing UNIX files, each said file being stored on said device at identified block addresses,
 (E) a memory manager for managing:
  (1) the allocation of virtual address space in said system, and
  (2) the transfer of information between said secondary storage device and said main memory, said memory manager including,
  (3) an external page table (XPT) including a plurality of XPT entries for correlating each said block address to at least one virtual page address, each said entry including a status field for indicating to said system the status of the corresponding virtual system, and (F) means for selectively mapping said files to designated segments of the virtual address space of said virtual memory, a method to automatically manage the size of each said designated segment through allocation of increments of XPT entries in accordance with the addresses in the instructions of said application program that are executed during said processing of a UNIX file, said method comprising the combination of the following sequential steps, (1) establishing for said system with said operating system, an allocatable increment of sequential virtual addresses comprising a fixed plurality of XPT entries, each said increment having a virtual address that defines the Upper Boundary of said increment, (2) allocating, with said operating system, a number of said increments to provide at least one XPT entry for each block on said device that contains information associated with said file being processed resulting in the current size of said segment being defined by said Upper Boundary of said last allocated segment, (3) establishing in each said XPT entry a status field for indicating to said system one of a plurality of processing states of the virtual page corresponding to said entry, (4) mapping said file to correlate the address of said each block to the virtual page address corresponding to the associated said one XPT entry, including the steps of;

(a) setting the status field of each said associated XPT entry to a first value, and (b) setting the status fields of said XPT entries between the virtual address representing the End of File (EOF) and the virtual address representing the end of the current segment, to a second value to indicate allocated, unmapped XPT entries, (5) interrupting the current instruction being executed in said application program when said current instruction involves a virtual address contained on an unmapped virtual page to indicate to said system that one of a plurality of predetermined protection exceptions has occurred, (6) automatically allocating with said operating system sufficient said increments when a first of said predetermined exceptions has been indicated, to accommodate said virtual address involved with said current instruction, (7) automatically mapping with said operating system at least one newly allocated disk block to one of said unmapped XPT entries when a second one of said predetermined exceptions has been indicated, and (I) reissuing said current instruction that was interrupted.

2. The method recited in claim 1 in which said main memory includes a plurality of page frames, each of which stores one virtual page comprising a plurality of sequential byte locations, each of which has a different virtual address, further including the step of, (A) determining with said memory manager that said current instruction is attempting to write to a virtual address location that is beyond said EOF address, and that the XPT entry corresponding to the virtual page containing said virtual address has been allocated but has not been mapped to cause said current instruction to be interrupted with said step of interrupting and said second one of said plurality of predetermined protection exceptions to be indicated to said system.

3. The method recited in claim 2 in which said memory manager includes a page faulting mechanism including means to convert a virtual address associated with said instruction to the storage location of the corresponding XPT entry only when said virtual address is contained on a virtual page that has been mapped, and in which said step of determining includes the further steps of, (A) invoking said page faulting mechanism in response to not locating said virtual address of said current instruction in said main memory, (B) converting said virtual address to the said location of said corresponding XPT entry, and (C) reading the status field of said corresponding XPT entry to determine that said XPT entry has been allocated but has not been mapped.

4. The method recited in claim 3 in which said memory manager further includes an Inverted Page Table having a separate entry for each page frame in said main memory for correlating virtual page addresses to page frame addresses in said main memory, including the further step of, (A) allocating a new page frame in main memory, and (B) protecting the corresponding said IPT entry to permit only read operations on said page frame prior to reissuing said interrupted instruction.

5. The method recited in claim 4 including the further steps of, (A) interrupting said reissued instruction when said memory manager determines that said new virtual page in said new page frame is protected read only, (B) allocating a new block location on said device for storing said new virtual page, (C) mapping the address of said new block to said corresponding unmapped XPT entry, (D) updating said protected IPT and XPT entries to permit said new virtual page to be written into, and (E) reissuing said interrupted instruction a second time to write into said new virtual page.

6. The method recited in claim 1 in which said memory manager further includes an Inverted Page Table (IPT) having an IPT entry for each said page frame for correlating the address of said page frame to the virtual address of the virtual page stored in said page frame, and said step of indicating includes the further step of, (A) determining with said memory manager that an instruction is attempting to write into a virtual address location that is beyond said Upper Boundary so said first one of said plurality of predetermined protection exceptions is indicated to said system.

7. The method recited in claim 6 in which said step of determining includes the further steps of, (A) checking said IPT with said memory manager to determine if a page fault has occurred because no page frame in main memory is storing a virtual page containing said protected virtual address, (B) checking said XPT with said memory manager when said step of checking said IPT indicates that a page fault has occurred, to determine if an allocated XPT entry has an associated virtual page that contains said protected virtual address, and (C) indicating to said system that said protected address is beyond said Upper Boundary if said steps of checking do not find an XPT entry having a virtual page containing said protected address, 8. The method recited in claim 7 in which said memory manager further includes a page fault handling mechanism for resolving page faults that occur in said system, including means to convert a virtual address associated with said instruction being executed to the storage location of the corresponding XPT entry only when said virtual address is contained on a virtual page that has been mapped, and in which said steps of checking include the further steps of, (A) invoking said page faulting mechanism after said first checking step in response to said page fault, (B) converting said virtual address to a table address where the address of a corresponding XPT would be located if an XPT entry had been allocated for that virtual address, and (C) invoking said step of indicating after concluding that an XPT entry has not been allocated for said virtual address that caused said page fault when said virtual address is not located at said table address.

9. The method recited in claim 8 in which said step of converting includes the further steps of, (A) hashing said virtual address to provide said table address, and (B) storing at said table address the addresses in a chained fashion of all XPT entries whose corresponding virtual pages hash to that table address.

10. The method recited in claim 9 in which said step of automatically allocating includes the further steps of, (A) increasing the size of said segment to accommodate the faulting virtual address by allocating additional increments of XPT entries sufficient to establish a new Upper Boundary beyond said faulting virtual address in response to an indication by said step of indicating that a first said protection exception has been indicated.

11. The method recited in claim 10 further including the step of, (A) interrupting the reissued instruction to indicate to said system that a second one of said predetermined protection exceptions has occurred because the value of the status field of the XPT entry associated with said faulting address indicates that said entry has not been mapped, and (B) issuing said instruction a third time after a page frame in main memory has been allocated, a disk block has been allocated, and a new EOF has been established and the appropriate entries in said XPT and IPT have been updated to correct said protection exception.

* * * * *